United States Patent
Capps et al.

(10) Patent No.: US 10,042,478 B2
(45) Date of Patent: Aug. 7, 2018

(54) REAR PROJECTION DISPLAY WITH NEAR-INFRARED EMITTING TOUCH SCREEN

(71) Applicant: Texas Instruments Incorporated, Dallas, TX (US)

(72) Inventors: Marshall Charles Capps, Farmers Branch, TX (US); Dana Franklin Segler, Jr., Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 126 days.

(21) Appl. No.: 14/588,271

(22) Filed: Dec. 31, 2014

(65) Prior Publication Data
US 2016/0188122 A1    Jun. 30, 2016

(51) Int. Cl.
G06F 3/042      (2006.01)
G09G 5/00       (2006.01)
H04N 5/33       (2006.01)

(52) U.S. Cl.
CPC .......... G06F 3/0425 (2013.01); G09G 5/003 (2013.01); G09G 2300/0426 (2013.01); H04N 5/33 (2013.01)

(58) Field of Classification Search
CPC ...... G06F 3/0425; G06F 3/042; G06F 3/0421; G09G 2300/0426; G09G 5/003; H04N 5/33; G03B 21/625; G03B 21/208; G03B 21/602; G03B 21/62; G03B 21/10; G03B 21/28; G03B 37/04; G02B 3/08; G02B 27/30; G02B 5/003; G02B 6/0051; G02F 1/1335; G02F 1/133526; G02F 2001/133607

USPC ........................................................ 345/175
See application file for complete search history.

(56) References Cited

U.S. PATENT DOCUMENTS

| | | | |
|---|---|---|---|
| 4,208,869 A | 6/1980 | Hanaoka | |
| 4,775,964 A | 10/1988 | Alessio et al. | |
| 5,104,210 A | 4/1992 | Tokas | |
| 6,755,534 B2 | 6/2004 | Veligdan et al. | |
| 6,905,215 B2 | 6/2005 | Selger, Jr. et al. | |
| 7,345,824 B2 | 3/2008 | Lubart et al. | |
| 2003/0122780 A1* | 7/2003 | Hendriks | G06F 3/0425 345/156 |
| 2008/0284925 A1 | 11/2008 | Han | |

(Continued)

OTHER PUBLICATIONS

Weiwei Mu, et al; Direct-Current and Alternating-Current Driving Si Quantum Dots-Based Light Emitting Device; IEEE Journal of Selected Topics in Quantum Electronics, vol. 20, No. 4, Jul./Aug. 2014.

*Primary Examiner* — Hong Zhou
(74) *Attorney, Agent, or Firm* — Michael A. Davis, Jr.; Charles A. Brill; Frank D. Cimino

(57) ABSTRACT

A rear-projection display. The display includes image modulation apparatus for projecting at least a first beam representing an image to be displayed. The display also includes a screen for receiving the first beam on a first side and displaying the image on a second side, opposite the first side. The screen includes energy-responsive apparatus for emitting near-IR light away from the second side. The display also includes a camera for detecting reflected near-IR light and processing circuitry for processing the detecting reflected near-IR light to determine a position touch on the second side.

22 Claims, 8 Drawing Sheets

(56) References Cited

U.S. PATENT DOCUMENTS

| | | | |
|---|---|---|---|
| 2009/0146992 A1* | 6/2009 | Fukunaga | G02F 1/13338 345/214 |
| 2009/0231515 A1* | 9/2009 | Keam | G02F 1/133602 349/71 |
| 2011/0096394 A1* | 4/2011 | Liu | G03B 21/62 359/457 |
| 2011/0199338 A1* | 8/2011 | Kim | G06F 3/0418 345/175 |
| 2012/0105341 A1* | 5/2012 | Park | G06F 3/0412 345/173 |
| 2012/0319999 A1* | 12/2012 | Kamiya | G02B 5/0231 345/175 |
| 2014/0111652 A1* | 4/2014 | So | G01J 1/58 348/164 |
| 2014/0277294 A1* | 9/2014 | Jones | A61N 5/062 607/88 |

* cited by examiner

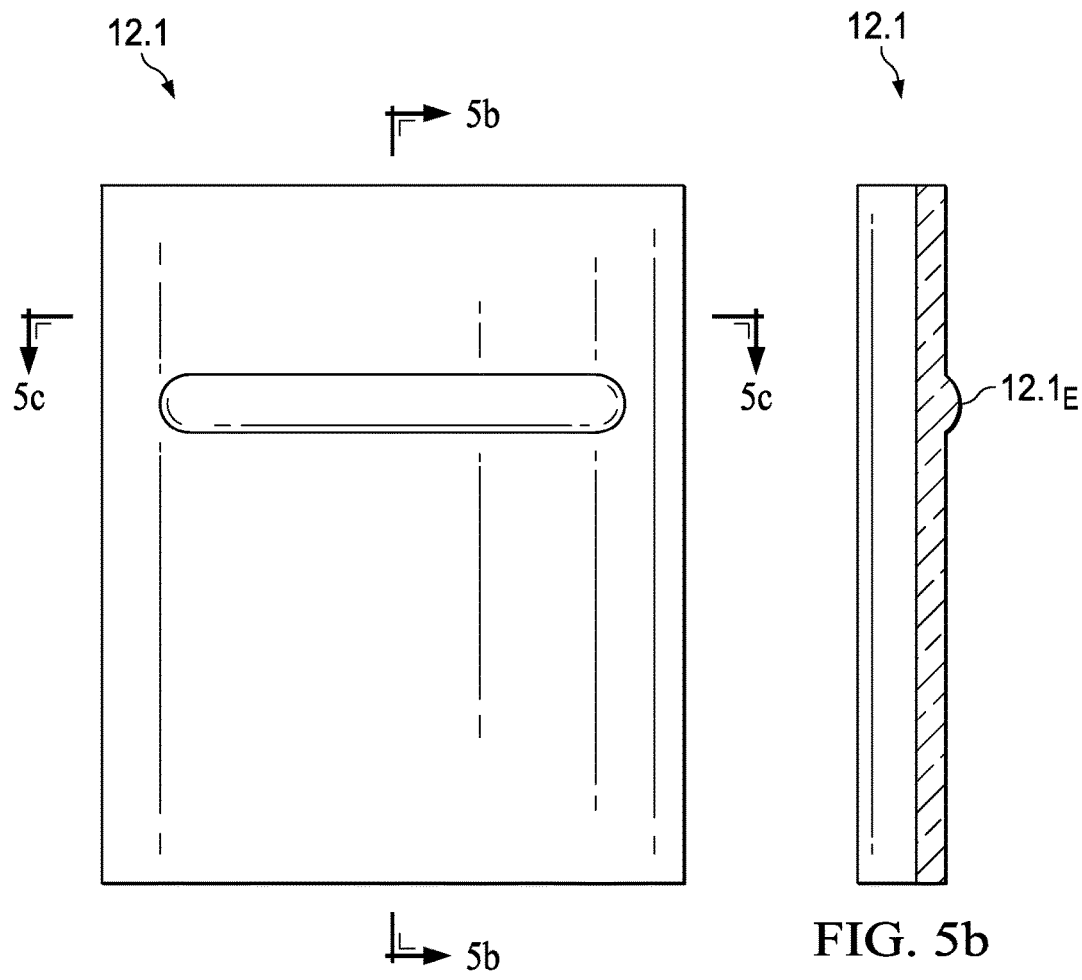
FIG. 5a
FIG. 5b
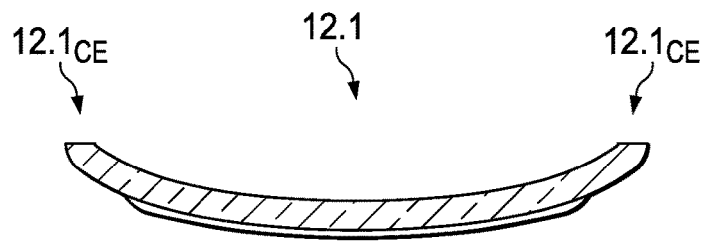
FIG. 5c

REAR PROJECTION DISPLAY WITH NEAR-INFRARED EMITTING TOUCH SCREEN

CROSS-REFERENCES TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The preferred embodiments relate to digital screen displays and more particularly to touch screen displays.

Touch screen technology refers to the ability of a screen device to detect and position fix when and where a finger, or some other element, makes contact with the screen. Such technology is growing in popularity and may be found in an increasing number of applications, including various types of displays that appear as monitors/televisions in homes, offices, and vehicles. One type of display is the rear projection display, which is characterized by some type of projecting device that is located behind the screen, that is, on the opposite side of the screen from the side that is viewed by a user. Newer rear projecting devices implement differing technologies to modulate the image that is displayed, including DLP® technology from Texas Instruments Incorporated.

Various prior art approaches have been implemented to attempt touch screen detection in rear projection devices, although such approaches also may have limitations.

One prior art known approach to rear projection touch screen technology is to include one or more infrared (IR), or near-IR, elements, and a camera, inside the projector (i.e., on the non-viewer side of) and at positions away from the screen. In operation, each IR or near-IR element emits its respective light toward and through the rear side of the screen so that, desirably, as a finger or other object touches the front of the screen, the finger/object is illuminated by the IR/near-IR light and the camera captures the reflection of the IR/near-IR light from the finger/object. Next, photo-imaging circuitry processes the camera-captured data and attempts to discern the reflection captured by the camera and associate a screen position with the reflection as corresponding to a screen touch. While this approach has some level of accuracy in detecting screen touches, it also is vulnerable to errors due to apparatus that are often included in the path of the IR/near-IR light. More particularly, displays typically include one or more light directing layers or apparatus, for purposes of directing the internally-projected light image accurately and aesthetically to a viewer of the screen. For example, a Fresnel lens is commonly included, which accepts rear projected light and attempts to normalize it all to a direction perpendicular to the screen. As another example, a diffuser is also commonly included, which receives the normalized light from the Fresnel lens and then diffuses some of it off the axis from which it was received, so as to allow some viewers to see an acceptable image quality from an axis other than directly in front of the screen. As a final example, the display may include other light affecting apparatus/layers, including one to reduce glare or reject ambient light that exists on the viewer's side of the screen. Recalling that the touch detection is enabled by IR/near-IR emitters inside the projector, however, note that any one or more of these layers/apparatus may affect the light as it passes from the emitter, toward such layers/apparatus, in an effort to reach a finger/object as it approaches or touches the viewer side of the screen. Specifically, such layers/apparatus may cause additional reflections, thereby creating non-uniformity reflections or so-called "hot spots" that are captured by the IR/near-IR sensing camera. These captured non-uniformities may be wrongfully interpreted as screen touches or may require extensive additional signal processing so as to distinguish from actual screen touches.

Another prior art known approach to rear projection touch screen technology again uses a camera inside the projector, along with an IR, or near-IR, illuminator adjacent the outside/viewer side of the screen. The light from the illuminator is passed through a typically-cylindrical lens that thereby projects the light in a "curtain" or "fan" across a majority or all of the viewer's side of the screen. An interactive touch thus interrupts the light curtain, thereby causing reflections, and the camera and processing technology is akin to that described above, so as to attempt to detect a reflection and its position relative to the screen area. This approach also has some level of accuracy in detecting screen touches, but likewise has drawbacks. For example, some modern and anticipated displays include curvatures or other interruptions or departures from the traditional planar surface—the single illuminated curtain is not feasible for such structures.

Still another prior art known approach to rear projection touch screen technology again uses a camera inside the projector, and in this instance the IR/near-IR light is applied or injected to an edge of the screen, which may be an acrylic material. This approach requires the maintenance of what is referred to in the art as total internal reflection (TIR), whereby the refractivity of the screen material and air have a certain ratio so that, when undisturbed, the edge-injected light reflects solely within the screen material. When a touch occurs at the screen, however, this frustrates the TIR, thereby permitting light reflections that were formerly maintained within the screen material to release, and that release may be detected by the related camera. This approach also has some level of accuracy in detecting screen touches, but likewise has drawbacks. For example, various restraints and considerations are required to maintain the TIR. As another example, as was the case with the light curtain approach, the introduction of screen curvature causes difficulty if not an impossibility of implementing this approach, as such curvatures may eliminate the ability to maintain an adequate TIR.

Given the preceding, the present inventors have identified potential improvements to the prior art, as are further detailed below.

BRIEF SUMMARY OF THE INVENTION

A preferred embodiment provides a rear-projection display. The display includes image modulation apparatus for projecting at least a first beam representing an image to be displayed. The display also includes a screen for receiving the first beam on a first side and displaying the image on a second side, opposite the first side. The screen includes energy-responsive apparatus for emitting near-IR light away from the second side. The display also includes a camera for detecting reflected near-IR light and processing circuitry for processing the detecting reflected near-IR light to determine a position touch on the second side.

Numerous other inventive aspects and preferred embodiments are also disclosed and claimed.

BRIEF DESCRIPTION OF THE SEVERAL VIEWS OF THE DRAWING

FIG. 5a illustrates a frontal view of a curved screen.

FIG. 5b illustrates a first cross-sectional view of the curved screen of FIG. 5a.

FIG. 5c illustrates a second cross-sectional view of the curved screen of FIG. 5a.

DETAILED DESCRIPTION OF EMBODIMENTS

Figure 1:
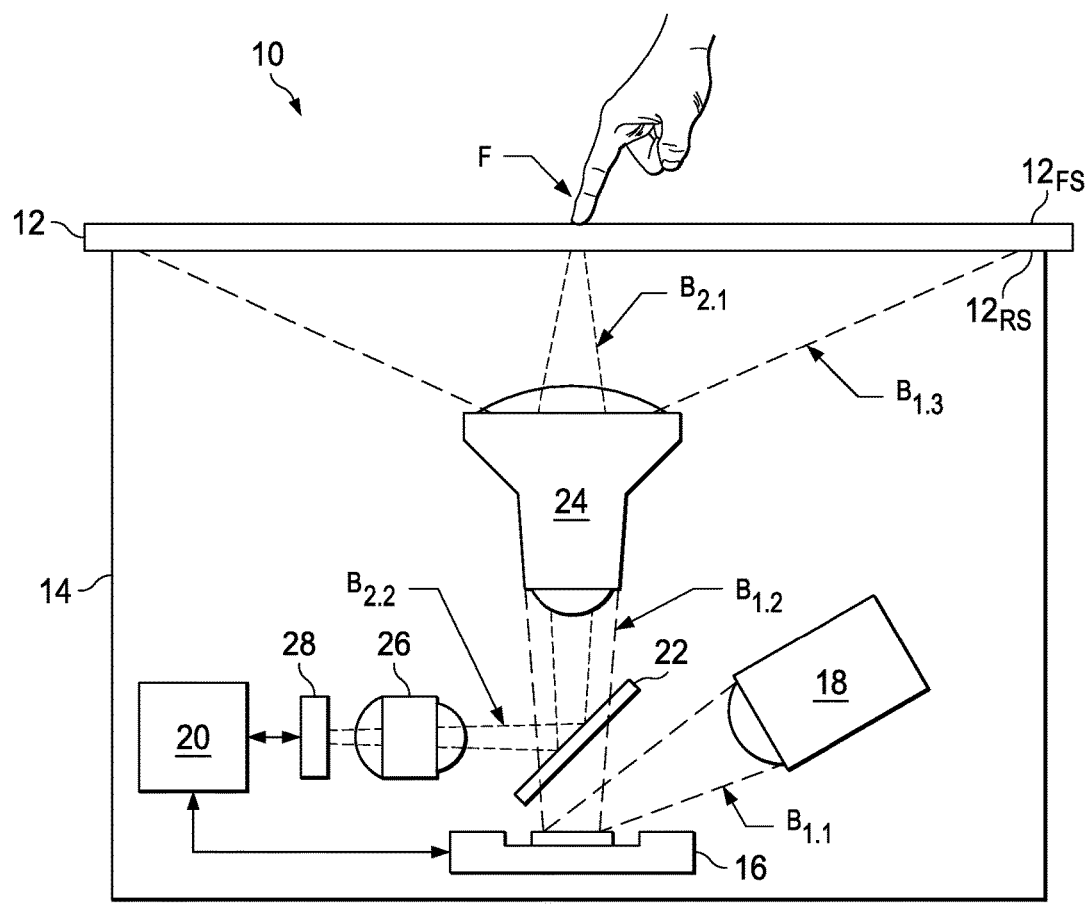
FIG. 1 illustrates a diagrammatic view of a touch screen display system according to a preferred embodiment.

FIG. 1 illustrates a diagrammatic view of a touch screen display system 10 according to a preferred embodiment. System 10 includes a screen 12, having a front surface $12_{FS}$ (i.e., the viewing side) and a rear surface $12_{RS}$, mounted relative to a support structure 14, such as a housing or frame. While not explicitly shown in FIG. 1, but as demonstrated later, screen 12 includes one or more layers of apparatus/materials, providing at least the function of displaying on front surface $12_{FS}$ an image to a viewer, where other functions may include light shaping (e.g., collimating, diffusing) for issues of image uniformity and angle of viewership, as well as ambient (i.e., outside of the interior defined by screen 12 and structure 14) light rejection. As also detailed below and by way of introduction to preferred embodiment aspects, screen 12 also emits a light, preferably near-infrared, away from front surface $12_{FS}$ so that an object, such as a finger F, when approaching or touching the screen, causes a reflection of the near-IR light, and that reflection is detected and located to support touch-screen functionality.

System 10 further includes, within the interior of support structure 14, apparatus for projecting an image toward rear surface $12_{RS}$, so that the image is thereby displayed and visible from front surface $12_{FS}$. By way of a preferred embodiment example, therefore, such apparatus includes an image source 16, as may be a digital micromirror device (DMD) array, as is commercially available as part of DLP® technology from Texas Instruments Incorporated. The DMD array can range from 0.2 to over an inch in diagonal dimension and includes over a million tiny, highly reflective micromirrors (sometimes called spatial light modulators) forming a micro-electrical-mechanical system, whereby each mirror may be individually tilted to selectively reflect light, as a pixel, from an illumination source 18. The light from illumination source 18 may include one or more light sources, such as red/green/blue (RGB), that may combine to form myriad colors, and is shown and referred to herein for sake of reference as a light beam $B_{1.1}$. A processing circuit 20 represents hardware and/or software as known in the art for light and image control and processing, which may therefore include a digital signal or other processor, memory, and related apparatus. Processing circuit 20 thus receives or stores image data that is converted to the appropriate control signals for the mirrors of image source 16, and illumination is provided by source 18, so that the reflected light matches the pattern/color of the desired image data, and the reflected light produces a light beam $B_{1.2}$, shown in FIG. 1 reflecting upward; beam $B_{1.2}$ passes through a dichroic filter 22 that transmits visible light and shorter wavelengths while reflecting near infrared light and longer wavelengths to provide an input to a first end of a projection lens 24. Projection lens 24 expands the width of beam $B_{1.2}$ to produce a corresponding, but wider, output beam $B_{1.3}$ from a second end of projection lens 24 and that accommodates the dimensions of screen 12, which may be in the range of 15 inches tall and 9 inches wide. The expanded, projected light passes through the layering of screen 12 and thereby presents an image on front surface $12_{FS}$.

As introduced above and as further detailed below, screen 12 emits a preferably near-IR light at least in a direction away from surface $12_{FS}$ (and away from the interior of support structure 14). Note that near-IR light is typically considered to be in the range from about 780 nm to 1,000 nm, but in some instances may reach upward to 2,500 nm. Thus, as an object external from support structure 14 approaches and/or touches front surface $12_{FS}$, part of the screen-emitted near-IR light reflects back through screen 12, toward the interior of support structure 14. To illustrate this latter aspect, FIG. 1 further shows a reflected near-IR beam $B_{2.1}$, passing from a tip of a finger F, through screen 12, to the second end of projection lens 24. Beam $B_{2.1}$ is thusly converted to a beam $B_{2.2}$, which reflects off dichroic filter 22 and passes through an additional lens 26 that images the screen onto a camera 28. In this regard, note that lens 26 magnifies and focuses the backside of the screen onto the camera sensor array area. Camera 28, which may be implemented with CMOS or other sensors, and with the interaction of processing circuit 20, is able to distinguish the reflection from beam $B_{2.1}$ (and beam $B_{2.2}$ or others in that light path such as from lens 26) from any additional received light and to approximate a coordinate position (e.g., x, y) of the location at which the finger F is touching front surface $12_{FS}$. In regard to this latter functionality, note that near-infrared point detection and coordinate determination are known in the art.

Figure 2A:
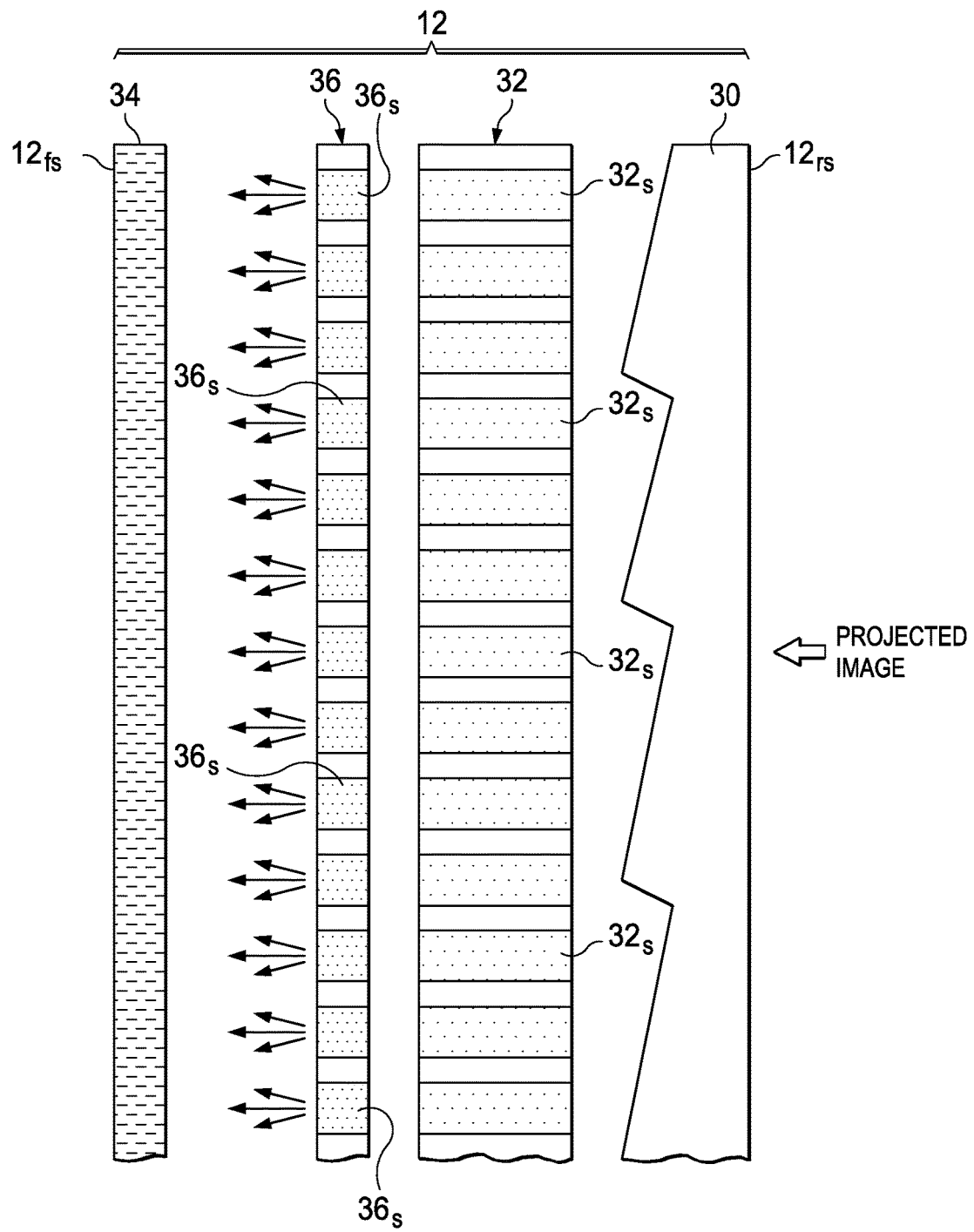
FIG. 2a illustrates a side cross-sectional exploded view.
Figure 2B:
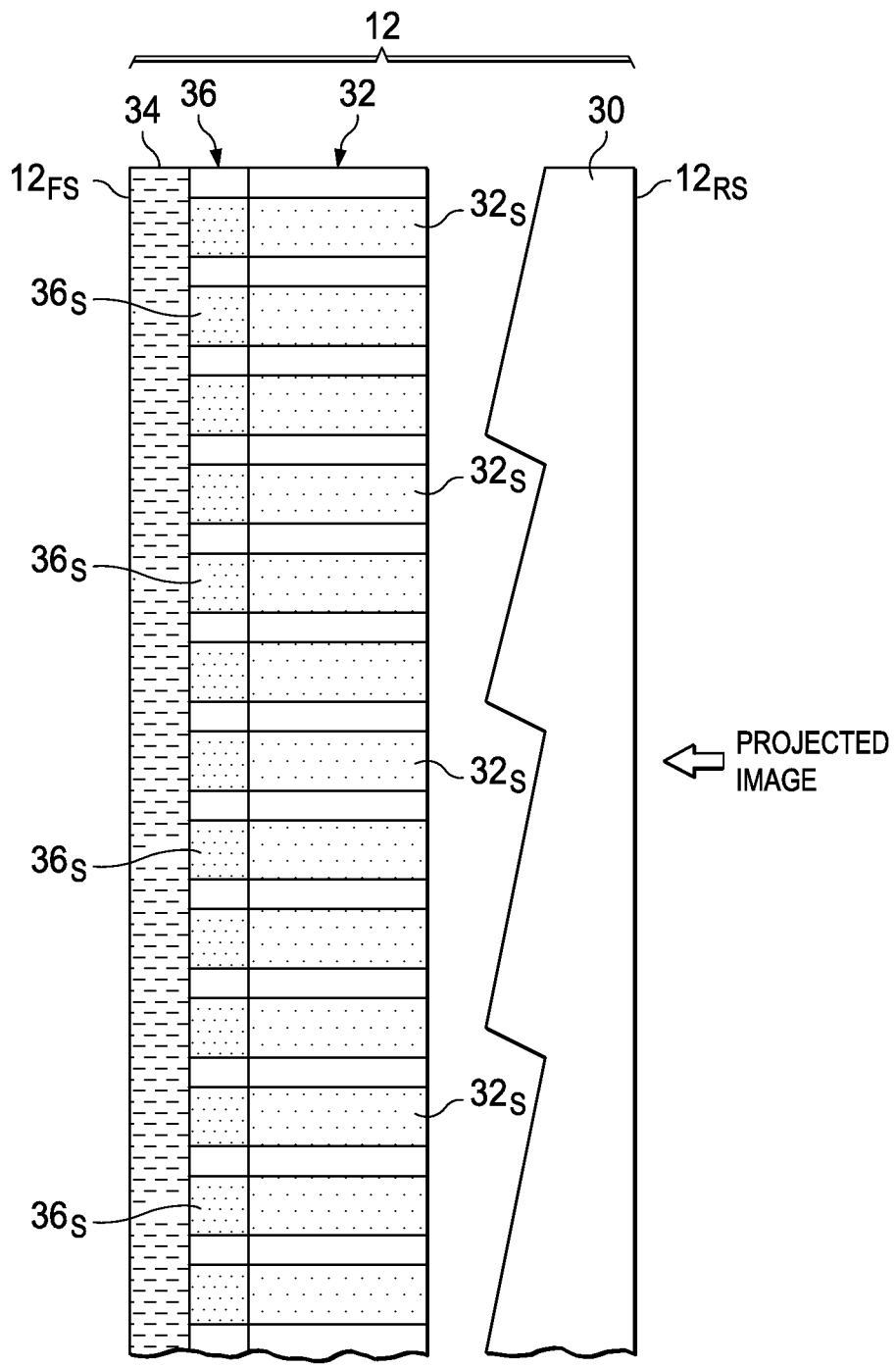
FIG. 2b illustrates a side cross-sectional exploded view, of various layers to be included in the preferred embodiment screen 12 of FIG. 1.

FIG. 2a illustrates a side cross-sectional exploded view, and FIG. 2b illustrates a side cross-sectional view, of various layers to be included in preferred embodiment screen 12 of FIG. 1. Looking generally from right to left, each of FIGS. 2a to 2b, rear surface $12_{RS}$ is one side of a Fresnel lens 30, which is to receive the projected image (e.g., beam $B_{1.3}$ in FIG. 1). The opposing side of Fresnel lens 30, as known in the art includes various non-linear edges or facets, sometimes formed across the screen as concentric rings. As known in the art, Fresnel lens 30 accepts light from rear surface $12_{RS}$ at various angles, and each edge bends light so as to normalize the direction of such light, toward front surface $12_{FS}$, along parallel lines, that is, lines orthogonal to the general plane of screen 12 and thus straight out toward a viewer. Lastly, note that Fresnel lens 30 is also shown herein by example, as other light turning or collimating structures (e.g., light turning film) may be used as alternatives.

To the left of Fresnel 30 is a lenticular lens 32, within which includes a number of dark stripes $32_S$, only some of which are labeled to simplify the drawing. Preferably, and as shown in the later example of FIG. 2c, each stripe $32_S$ is oriented horizontally with respect to and across the entire width of screen 12; in other embodiments, however, the orientation of such stripes may be in a different direction, such as vertical or various other angles, as may be required for some pixelated displays depending, for example, on pixel pitch or pitch of the stripe, so as to minimize moire effects. Each stripe $32_S$ is very thin in height, such as in the range of tens of micrometers, and adjacent stripes are preferably spaced apart by a distance in the range of tens of micrometers. Stripes $32_S$ may be formed in various manners, including using so-called micro-louvers, and serve the function of rejecting ambient light from front surface $12_{FS}$, such as by absorbing light from the side of front surface $12_{FS}$ so that it is not reflected back to a viewer. In addition, stripes $32_S$ may contribute to the appearance of blackening screen 12 to the viewer.

To the far left in FIGS. 2a and 2b is a diffuser layer 34. As known in the art, diffuser layer receives projected light from Fresnel 30 (via intermediate layers), and diffuser layer 34 adds a diffusion functionality so that some of the light is scattered away from the path from which it was received on the opposite side of front surface $12_{FS}$. Thus, the scattered light is redirected in many directions away from front surface $12_{FS}$, so as to provide a more desirable image to a viewer that might observe screen 12 from an angle outside of a somewhat straight view. While not shown, note that screen 12 may include additional or alternative layers, including, for example, an additional clear layer to the right of, or as part of, diffuser layer 34. This layer, as well as others, may be constructed of various materials, such as acrylic, polycarbonate, MBS, or glass. Lastly, note that diffuser layer 34 is also shown herein by example, as an alternative preferred embodiment may instead implement a lenticular layer.

Figure 2C:
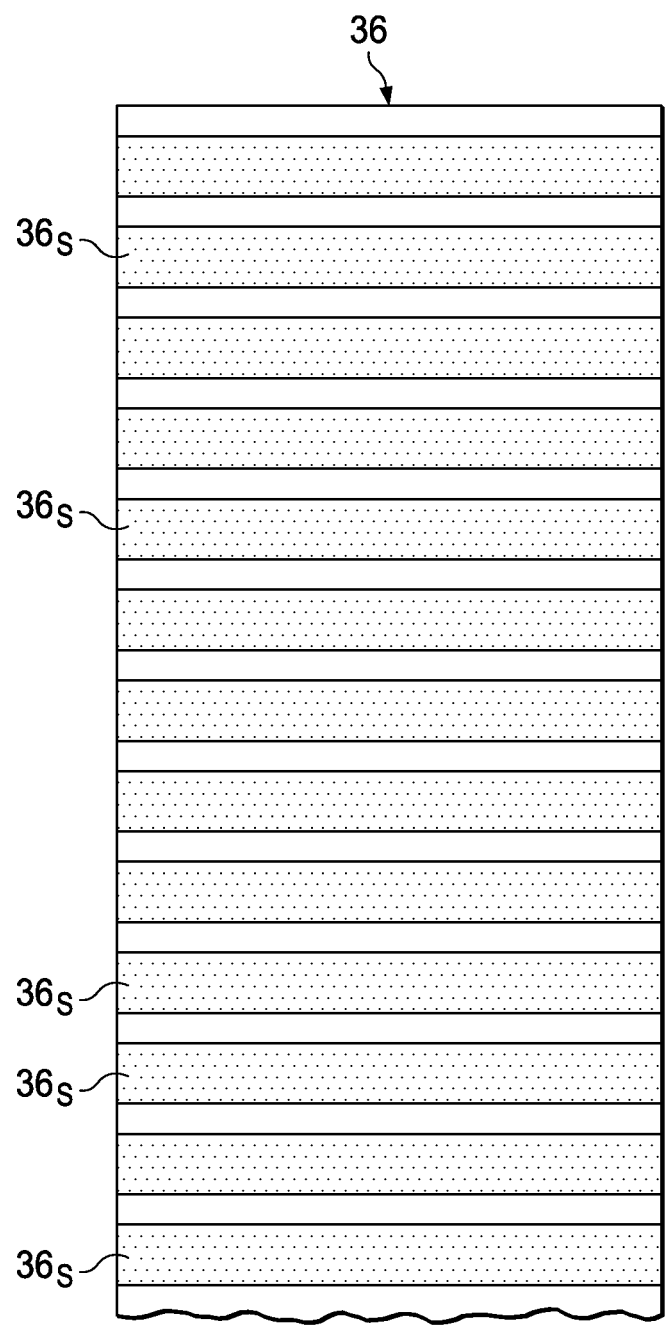
FIG. 2c illustrates a frontal view of a layer 36 of the screen 12 from FIGS. 2a and 2b.

Lastly, to the left of lenticular lens 32, and to the right of diffuser layer 34, is a near-IR emitting layer 36, which is also shown in a frontal view in FIG. 2c. Near-IR emitting layer 36 includes a number of near-IR emitting stripes $36_S$, only some of which are labeled to simplify the drawing. In a preferred embodiment, each stripe $36_S$ is physically aligned to coincide with a respective stripe $32_S$ on lenticular lens 32. Thus, each stripe $36_S$ has a same orientation (e.g., horizontal; vertical), as well as dimension as a stripe $32_S$ (e.g., 50 um). Each stripe $36_S$ is formed by a material and/or process so as to create an energy-excitable apparatus that is operable to emit near-IR light, preferably in the direction of front surface $12_{FS}$, and shown generally in FIG. 2a by an indication of dashed arrows of illumination from each stripe $36_S$—thus, when screen 12 is fully assembled, such emitted light is preferably away from the interior of support structure 14 and from front surface $12_{FS}$. Note also that by preferably aligning each stripe $36_S$ with a corresponding stripe $32_S$, the latter should prevent most near-IR light from the former from traveling back inside the projector. Processes for forming stripes $36_S$ may include printing, molding, deposition, lamination, coating, and still others, as may be selected or ascertained by one skilled in the art. Moreover, various preferred embodiments exist for certain additional aspects for providing such stripes $36_S$, as further detailed below. Lastly, note that near-IR light emitted by layer 36 may be continuously emitted during operation, or in an alternative preferred embodiment, such light may be modulated, which may have certain additional benefits (e.g., assisting with rejection of ambient light).

Figure 3A:
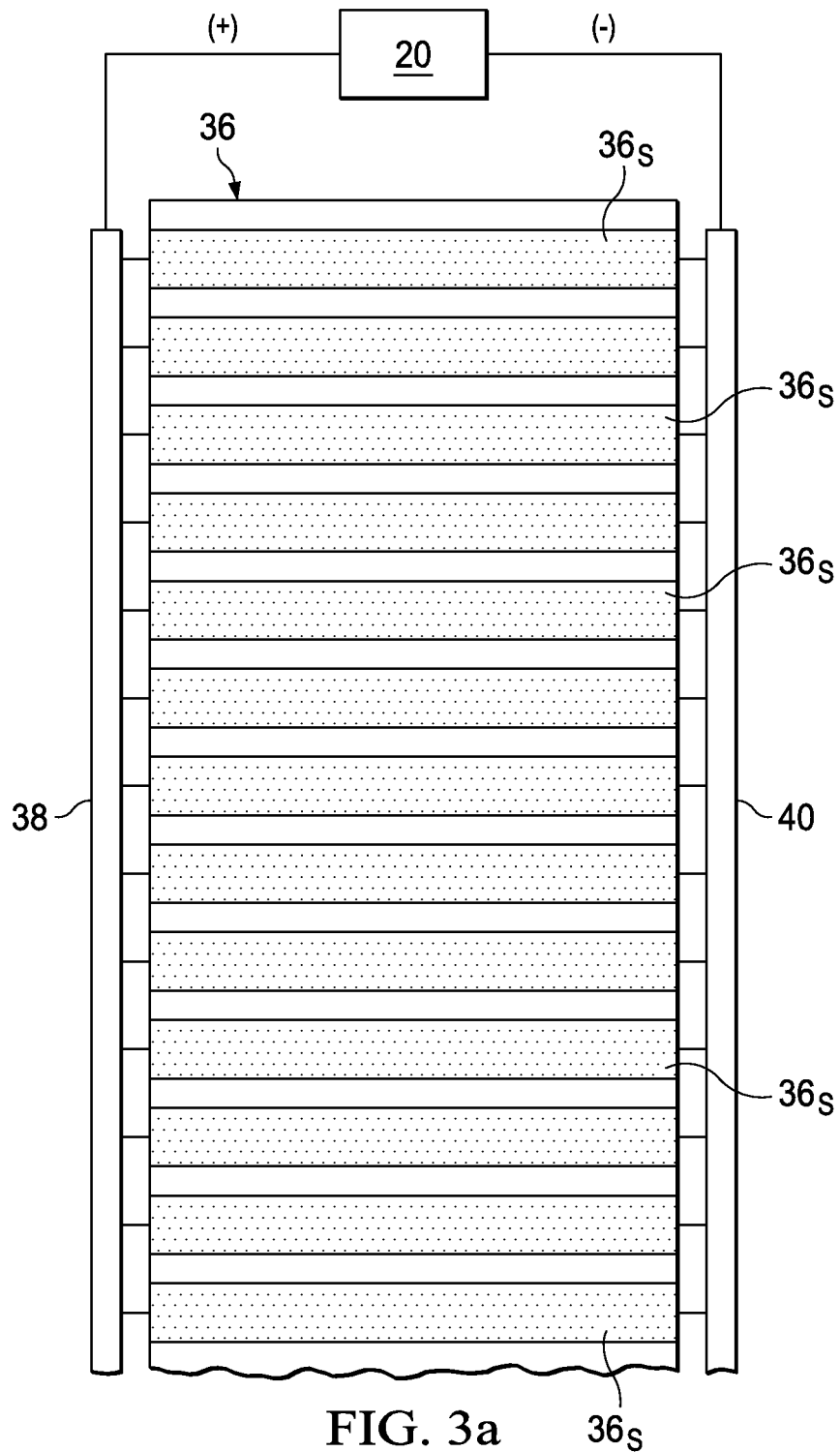
FIG. 3a includes the FIG. 2c layer 36, along with electrodes connected to its near-IR emitting stripes.
Figure 3B:
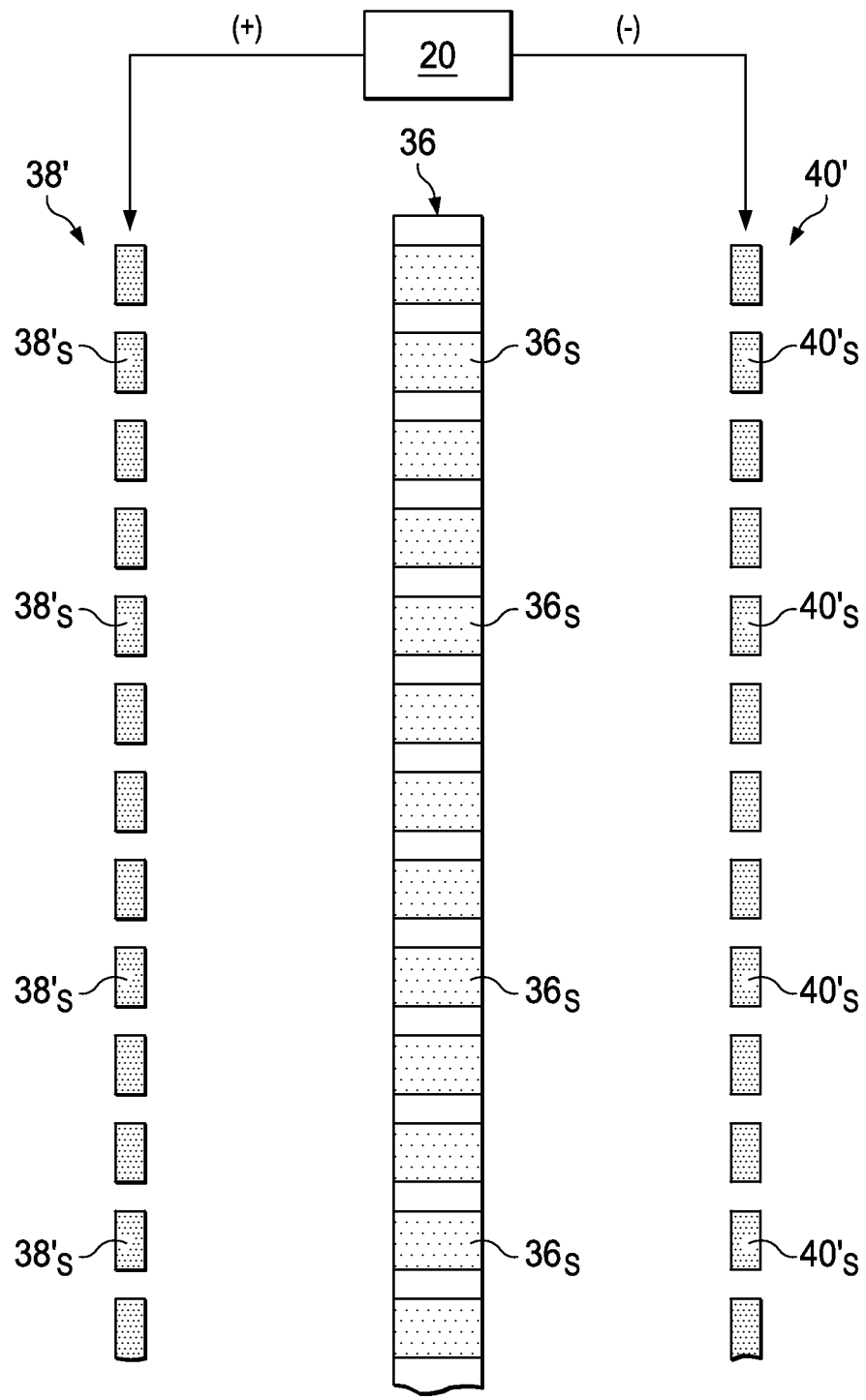
FIG. 3b illustrates a side exploded view of electrodes on both sides of near-IR emitting stripes.

In a first preferred embodiment, stripes $36_S$ are formed from an electroluminescent material, or quantum dots, that will emit near-IR light in response to excitation from electricity. In this regard, FIG. 3a again includes the FIG. 2c illustration of near-IR emitting layer 34, but diagrammatically adds a first electrode 38 adjacent and electrically coupled to a first end of stripes $36_S$ and a second electrode 40 adjacent and electrically coupled to a second end of stripes $36_S$. Moreover, FIG. 3a further illustrates that processing circuit 20, shown and described earlier in connection with FIG. 1, is electrically coupled to electrodes 38 and 40. In this regard, and at the appropriate timing as ascertainable by one skilled in the art, processing circuit 20 may apply, or control a power source to apply, opposing bias potentials (e.g., positive voltage and ground) to electrodes 38 and 40, thereby providing an excitation source of electricity so as to cause each stripe $36_S$ to emit near-IR light. Moreover, note that electrodes 38 and 40 may be implemented in alternative ways. As one example of an alternative, FIG. 3b illustrates a side exploded view of layer 36 as shown in FIGS. 2a and 2b. In addition, FIG. 3b illustrates an alternative preferred embodiment for the electrodes, which appear as electrodes 38' and 40'. In this embodiment, each such electrode 38' and 40' is formed by a number of respective conductive and preferably transparent stripes $38'_S$ and $40'_S$, where such stripes may be joined together by an insulating membrane, member, or the like to form another layer, or they may be individual stripes as shown in the Figure. A conductive and transparent material for electrodes 38' and 40' may be Indium tin oxide (ITO), by way of example. In any event, therefore, each of stripes $38'_S$ and $40'_S$ aligns with a respective near-IR emitting stripe $36_S$, so when the exploded view is combined (e.g., in a manner akin to FIG. 2b), the electrodes may receive a respective electrical signal so as to energize and cause the respective stripe $36_S$ to emit near-IR light. As another example of an alternative for implementing electrodes 38 and 40, note that the material used in FIGS. 2a and 2b for dark stripes $32_S$ may be chosen as a conductive material, in which case layer 32 will serve as both as one conductor $40'_S$ as shown in FIG. 3b, as well as the ambient light rejecting function described earlier. Then, a separate conductor can be provided for the second conductor, such as shown by conductor 38 in FIG. 3b.

Figure 4:
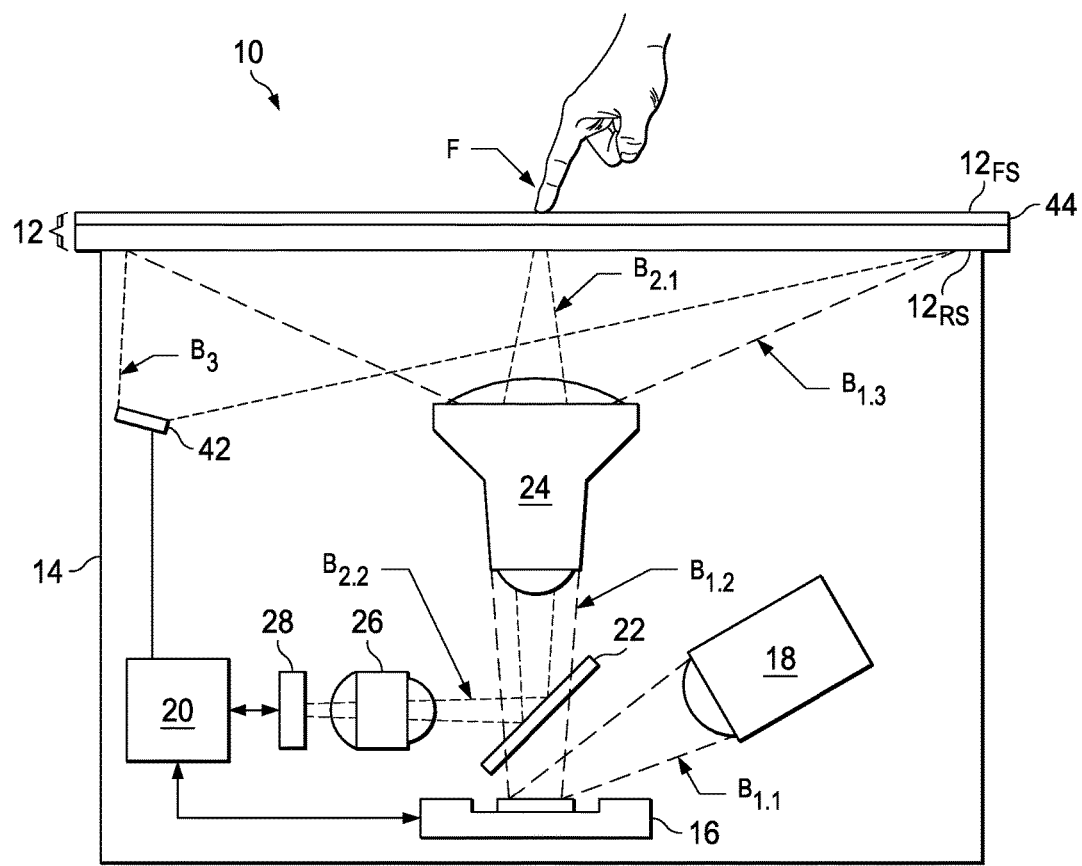
FIG. 4 includes the FIG. 1 illustration of system 10, along with a photoluminescence-excitation source 42.

In a second preferred embodiment, stripes $36_S$ are formed from a material that will emit near-IR in response to excitation from a non-near-IR light source. For example, a phosphor or other substance may be used so as to fluoresce when excited by photons. In this regard, FIG. 4 again includes the FIG. 1 illustration, which includes screen 12 that is now understood to include a near-IR emitting layer 36. In addition, system 10 includes a photoluminescence-excitation source 42, such as a light emitter for outputting a non-near-infrared beam $B_3$, having a wavelength $\lambda_e$ chosen outside of the near-IR spectrum yet to excite the luminescent material stripes $36_S$ to emit near-IR light. Note, therefore, that near-infrared light is not originally emitted within support structure 14, but instead wavelength $\lambda_e$ excites the emission of near-infrared light away from front surface $12_{FS}$ and toward the ambient, so that any returned near-infrared light into the interior of support structure 14 will be a reflection, such as beam $B_{2.1}$. Further in this regard, in this preferred embodiment, this chosen wavelength $\lambda_e$ should be such that beam $B_3$ passes through dark stripes $32_S$, that is, of a wavelength $\lambda_e$ for which the material for dark stripes $32_S$ is optically transparent. In addition, both the chosen wavelength $\lambda_e$, and the responsiveness of camera 28, should be such that camera 28 does not detect any reflections of beam $B_3$ (i.e., any reflection of the non-near-IR $\lambda_e$), but rather, only that of the reflected near-IR from beam $B_{2.1}$ (and beam $B_{2.2}$ and the additional beam from lens 26). Lastly, for this second preferred embodiment, screen 12 also may include an additional layer 44 that allow the emitted near-IR to pass, while also: (1) blocking both the internal source of the chosen wavelength $\lambda_e$ from reaching ambient; and (2) blocking any external source that also may have the chosen wavelength $\lambda_e$. For example, if the chosen wavelength $\lambda_e$ corresponds to ultraviolet (UV) light, then layer 44 could: (1) prevent the internal source of that light from exiting system 10 and potentially reaching a viewer's eyes; and (2) at the same time layer 42 blocks any external source (e.g., sunlight) from undesirably exciting the stripes $36_S$.

FIG. 5a illustrates a frontal view of a curved screen 12.1. FIG. 5b illustrates a first cross-sectional view of curved screen 12.1 of FIG. 5a, and FIG. 5c illustrates a second cross-sectional view of curved screen 12.1 of FIG. 5a. In all events, FIGS. 5a-5c demonstrate that an additional preferred embodiment further includes the use of a non-planar screen, in contrast for example to various prior art approaches. Thus, screen 12.1 may include various layers consistent with the above teaching, and in particular near-IR emitting layer 36. In this manner, near-IR light is emitted relative to screen 12.1, regardless of non-planar or non-linear features. As one example, screen 12.1 is shown to include a design element 12.1$_E$ that may cause a protrusion from the screen, as seen in the cross-section of FIG. 5b. As another example, screen 12.1 is shown to include curved ends 12.1$_{CE}$. Such features may be useful for various applications, such as in-vehicle displays and the like. Regardless of such features, however, the preferred embodiment functionality of accurate touch screen position detection is maintained.

From the above, various embodiments provide numerous improvements to the prior art. Such improvements include a display, preferably rear projecting, that has a screen with apparatus included to emit near-IR light away from the screen in response to an excitation source, such as electricity or another non-near-IR light source. Moreover, various other aspects have been described, and still others will be ascertainable by one skilled in the art from the present teachings. For example, while certain dimensions have been provided, variations are anticipated. As another example, the material of stripes $36_S$ also may be in the gaps between stripes $32_S$, although this could affect perceived contrast. As still another example, the ordering of the layers of screen 12 may be adjusted, for example by having layer 36 closest to the viewer, followed by layer 32, then layer 34, and Fresnel lens 30. Thus, while various alternatives have been provided according to the disclosed embodiments, still others are contemplated. Given the preceding, therefore, one skilled in the art should further appreciate that while some embodiments have been described in detail, various substitutions, modifications or alterations can be made to the descriptions set forth above without departing from the inventive scope, as is defined by the following claims.

The invention claimed is:

1. A rear-projection display, comprising:
    image modulation apparatus to project at least one beam representing an image to be displayed;
    a screen to receive the beam on a first side of the screen and to display the image on a second side of the screen, the second side being opposite the first side, the screen comprising a lens layer and an energy-responsive layer, the lens layer being positioned between the energy-responsive layer and the first side, the energy-responsive layer being positioned between the lens layer and the second side, the first side comprising a collimating structure to direct the beam from the first side to the second side via first striped regions of the lens layer and via second striped regions of the energy-responsive layer, the second striped regions being physically aligned to coincide with the first striped regions, the energy-responsive layer comprising third striped regions to emit near-IR light to the second side in response to an excitation source that is selected from a group consisting of an electrical excitation source and a photoluminescence excitation source, the lens layer having fourth striped regions of material to reject light from the second side, the fourth striped regions being physically aligned to coincide with the third striped regions, and the second side comprising a diffusion layer;
    a camera, positioned apart from the screen, to view the first side for detecting a portion of the emitted near-IR light reflected back from the second side to the first side via the second striped regions and via the first striped regions; and
    processing circuitry to process the detected portion to determine a position touch on the second side.

2. The display of claim 1 wherein the third striped regions comprise electroluminescent material.

3. The display of claim 1 wherein the third striped regions comprise quantum dots.

4. The display of claim 1 wherein the excitation source is the photoluminescence excitation source, and the display further comprises:
    a housing that in combination with the screen defines a display interior;
    wherein the screen further comprises material for blocking light from the photoluminescence excitation source against reaching outside of the display interior.

5. The display of claim 1 wherein the excitation source is the photoluminescence excitation source, and the display further comprises:
    a housing that in combination with the screen defines a display interior;
    wherein the photoluminescence excitation source has a wavelength $\lambda_e$; and
    wherein the screen further comprises material for blocking light having the wavelength $\lambda_e$ against reaching the third striped regions from outside of the display interior.

6. The display of claim 1 wherein the third striped regions comprise phosphor.

7. The display of claim 1 wherein the first, second, third and fourth striped regions are aligned horizontally relative to an orientation of the screen.

8. The display of claim 1 wherein the first, second, third and fourth striped regions are aligned vertically relative to an orientation of the screen.

9. The display of claim 1 wherein the collimating structure comprises a Fresnel layer.

10. The display of claim 1 wherein the screen forms a planar surface.

11. The display of claim 1 wherein the screen forms a non-planar surface.

12. The display of claim 1 wherein the excitation source is the electrical excitation source, the third striped regions comprise electroluminescent apparatus, and the screen further comprises a first electrode and a second electrode for energizing the electroluminescent apparatus.

13. The display of claim 12 wherein the first electrode, the second electrode, and the electroluminescent apparatus are physically aligned with each other.

14. The display of claim 13 wherein the first electrode, the second electrode, and the electroluminescent apparatus are physically aligned with each other as stripes.

15. The display of claim 12 wherein each of the first electrode and the second electrode comprises a transparent material.

16. The display of claim 12:
wherein the first electrode comprises a transparent material; and
wherein the second electrode comprises a material for rejecting light from the second side.

17. The display of claim 1 wherein the third striped regions are for continuously emitting the near-IR light to the second side during operation of the display.

18. The display of claim 1 wherein the third striped regions are for emitting the near-IR light to the second side in a modulated manner during operation of the display.

19. The display of claim 1, further comprising:
a housing that in combination with the screen defines a display interior;
wherein the third striped regions are for emitting the near-IR light to the second side toward outside of the display interior.

20. A method of operating a rear-projection display, the method comprising:
from image modulation apparatus, projecting at least one beam representing an image to be displayed;
with a screen having first and second sides, the first side comprising a collimating structure, and the second side comprising a diffusion layer, receiving the beam on the first side, and displaying the image on the second side opposite the first side, wherein displaying the image comprises: with the collimating structure, directing the beam from the first side the second side via first striped regions of a lens layer and via second striped regions of an energy-responsive layer, the lens layer being positioned between the energy-responsive layer and the first side, the energy-responsive layer being positioned between the lens layer and the second side, and the second striped regions being physically aligned to coincide with the first striped regions;
with third striped regions of the energy-responsive layer, emitting near-IR light to the second side in response to an excitation source that is selected from a group consisting of an electrical excitation source and a photoluminescence excitation source, the lens layer having fourth striped regions of material to reject light from the second side, and the fourth striped regions being physically aligned to coincide with the third striped regions;
with a camera positioned apart from the screen, viewing the first side for detecting a portion of the emitted near-IR light reflected back from the second side to the first side via the second striped regions and via the first striped regions; and
processing the detected portion to determine a position touch on the second side.

21. The method of claim 20 wherein the excitation source is the electrical excitation source.

22. The method of claim 20 wherein the excitation source is the photoluminescence excitation source.

* * * * *